(12) United States Patent
Yajima et al.

(10) Patent No.: US 6,685,136 B2
(45) Date of Patent: Feb. 3, 2004

(54) PRESSURE-RESISTANT BALLOON

(75) Inventors: Nobuyuki Yajima, Sagamihara (JP);
Naoki Izutsu, Sagamihara (JP);
Hideyuki Honda, Sagamihara (JP)

(73) Assignee: The Director-General of the Institute of Space and Astronautical Science, Sagamihara (JP)

( * ) Notice: Subject to any disclaimer, the term of this patent is extended or adjusted under 35 U.S.C. 154(b) by 0 days.

(21) Appl. No.: 10/288,544

(22) Filed: Nov. 6, 2002

(65) Prior Publication Data

US 2003/0106960 A1 Jun. 12, 2003

(30) Foreign Application Priority Data

Dec. 7, 2001 (JP) ........................................ 2001-374650

(51) Int. Cl.[7] .............................. B64B 1/58; B64B 1/40
(52) U.S. Cl. ...................................................... 244/31
(58) Field of Search ........................... 244/31, 33, 128; 116/DIG. 9

(56) References Cited

U.S. PATENT DOCUMENTS

| | | | | |
|---|---|---|---|---|
| 4,032,086 A | * | 6/1977 | Cooke ........................... 244/30 |
| 4,420,130 A | * | 12/1983 | Regipa .......................... 244/31 |
| 4,434,958 A | * | 3/1984 | Rougeron et al. ........... 244/126 |
| 5,104,059 A | * | 4/1992 | Rand et al. .................... 244/31 |
| 6,290,172 B1 | * | 9/2001 | Yajima et al. ................. 244/31 |

* cited by examiner

Primary Examiner—Robert P. Swiatek
(74) Attorney, Agent, or Firm—Oblon, Spivak, McClelland, Maier & Neustadt, P.C.

(57) ABSTRACT

A pressure-resistant balloon includes a gasbag and a volume changing mechanism which deforms the gasbag in a fully inflated state to change a volume of the gasbag. The gasbag includes spindle-shaped gores of an airtight film material, adjacent gores joined together at side edges, and load tapes fitted to joined sections of the side edges, and extending along the side edges, respectively. After inflated, the gasbag allows no gas to be discharged so as to maintain an internal gas pressure. Each of the gores outwardly protrudes between two adjacent load tapes without an elongation of the airtight film material of the gore, when the gasbag is in the fully inflated state. The protruding gore has a radius of curvature in a direction intersecting with the two adjacent load tapes. The radius of curvature is smaller than a radius of the gasbag.

7 Claims, 6 Drawing Sheets

PRESSURE-RESISTANT BALLOON

CROSS-REFERENCE TO RELATED APPLICATIONS

This application is based upon and claims the benefit of priority from the prior Japanese Patent Application No. 2001-374650, filed Dec. 7, 2001, the entire contents of which are incorporated herein by reference.

BACKGROUND OF THE INVENTION

1. Field of the Invention

This invention relates to a pressure-resistant balloon. More particularly, the invention relates to pressure-resistant balloons such as a scientific observation balloons used in stratosphere or a cosmic observation, recreational hot-air balloons, and gas balloons.

2. Description of the Related Art

Some scientific observation balloons are designed to fly in the stratosphere at altitudes ranging from 30 to 40 km. To regulate the flying altitude of such a high-altitude balloon, the buoyant gas is discharged from the balloon to reduce the buoyancy and certain amount of ballast is dropped to recover the high flying-altitude. However, the flying altitude can no longer be regulated once all ballast is dropped.

A super-pressure balloon having a pressure-resistant gasbag that withstands high internal pressures to stay at high flying-altitudes is known. The gasbag is inflated to its maximum capacity, and the buoyant gas is not discharged from the gasbag. Maintaining the maximum capacity and the internal gas pressure, the super-pressure balloon keeps rising. As the balloon rises, its buoyancy is reduced to a certain extent due to a decrease in air density. Eventually, the balloon assumes state of equilibrium at a certain altitude. Then, the balloon keeps flying in the horizontal direction at that altitude. If the internal gas temperature falls after sunset, the internal gas pressure decreases. Despite the decrease of the internal gas pressure, the gasbag can maintain its maximum volume. The super-pressure balloon can therefore continue to flying horizontally without the necessity of dropping ballast. Thus, the super-pressure balloon can fly for a long time, with no need to drop large amount of ballast, unlike the conventional balloons. Although the super-pressure balloon can maintain a certain altitude, it cannot change its flying altitude without difficulty.

Some super-pressure balloons have an air bag provided within the gasbag. Air is injected into the air bag, changing the effective volume of the gasbag in order to change the flying altitude of the balloon. In the stratosphere where air is very thin, however, a strong blower or a pump must be used to inflate the air bag within a short time. However, the use of a strong blower or pump is not feasible particularly in the case of a large size balloon.

BRIEF SUMMARY OF THE INVENTION

A pressure-resistant balloon comprises an airtight pressure-resistant gasbag and a volume changing mechanism which deforms the gasbag in a fully inflated state to change a volume of the gasbag. The gasbag includes a plurality of spindle-shaped gores of an airtight film material, adjacent gores joined together at side edges, and a set of load tapes fitted to joined sections of the side edges, the load tapes extending along the side edges, respectively. The gasbag, after inflated, allows no gas to be discharged so as to maintain an internal gas pressure. Each of the gores outwardly protrudes between two adjacent load tapes extending along the side edges of the gore, respectively, without an elongation of the airtight film material of the gore, when the gasbag is in the fully inflated state. The protruding gore has a radius of curvature in a direction intersecting with the two adjacent load tapes. The radius of curvature is smaller than a radius of the gasbag. The protruding gore is subject to a tensile force which is directed in the direction intersecting with the two adjacent load tapes.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serves to explain the principles of the invention.

DETAILED DESCRIPTION OF THE INVENTION

Figures 1A, 1B:
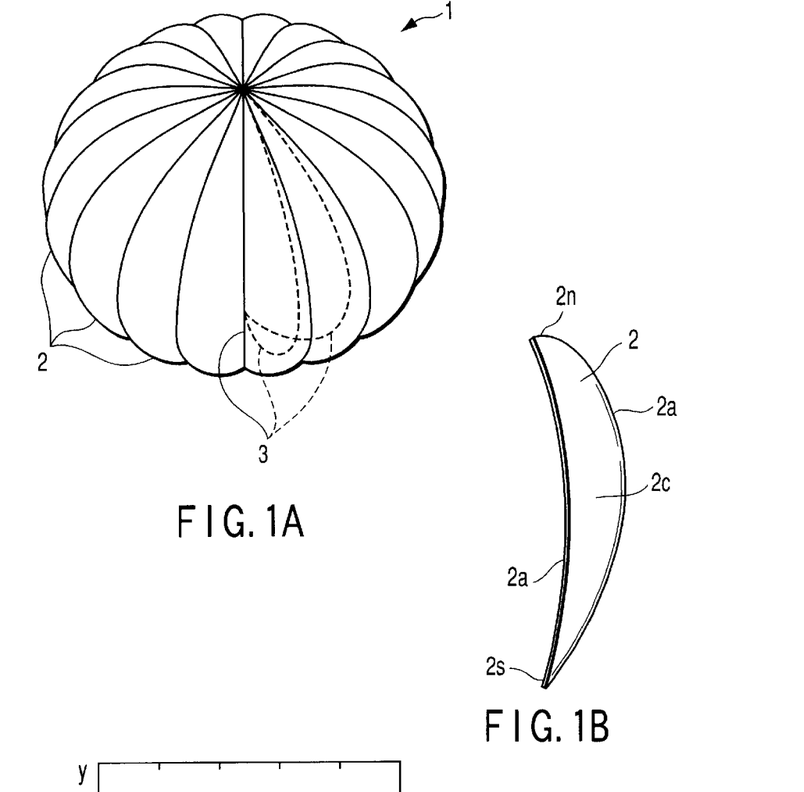
FIG. 1A is a perspective view of a pressure-resistant balloon according to a first embodiment.
FIG. 1B is a perspective view of a gore of the pressure-resistant balloon.

FIG. 1A is a perspective view of a pressure-resistant balloon that is the first embodiment of the invention. The balloon comprises a gasbag 1 that is filled typically with helium, which gives buoyancy to the balloon. Once inflated, gasbag 1 allows no gas to be discharged. Gasbag 1 therefore maintains the internal gas pressure and, hence, buoyancy of the balloon. A payload (not shown in FIG. 1A) including an observation equipment is attached to gasbag 1.

Gasbag 1 is substantially spherical. It is formed by joining a large number N of identical spindle-shaped gores 2 shown in FIG. 1B. In other words, gasbag 1 is composed of N gores. Each gore 2 is made of an airtight film material such as lightweight, strong woven textile or plastic film. Adjacent gores 2 are sewn or bonded at their side edges 2a, and are joined together to form airtight gasbag 1. The balloon includes a set of load tapes 3 that can withstand strong tensile forces. Load tapes 3 are sewn or bonded to the joined sections of side edges 2a, respectively, and extend along the side edges 2a. Load tapes 3 increase the joining strength of gores 2 and distribute payload weight to gores 2. Load tapes 3 further keep the shape of inflated gasbag 1 constant. When the gasbag is in a fully inflated state, each gore 2 outwardly protrudes between two adjacent load tapes 3 that respectively extend along the side edges 2a of the gore 2, without the elongation of the airtight film material of the gore 2. The term "fully inflated state" as used herein means a state where the difference dP between the internal and external pressures (i.e., internal pressure—external pressure) of gasbag 1 is positive and the volume of gasbag 1 remains unchanged, without the elongation of the film material of each gore 2 when the internal pressure is raised. The pressure-resistant balloon has a volume changing mechanism (described in detail hereinafter). The mechanism deforms gasbag 1 in the fully inflated state to change the volume of gasbag 1.

Gasbag 1 can take a "natural shape" which changes depending on the pressure difference dP (>0). For convenience of explanation, the shape of a gasbag not provided with load tapes will be described below. As long as gasbag 1 has the natural shape, the balloon can attain the maximal buoyancy under condition 1 that the meridian length is constant and condition 2 that the latitudinal (peripheral) length can be freely increased whenever necessary. In either condition, the axis of the gasbag, passing through opposite ends of each gore acts as axis of earth. The natural shape is rotationally symmetric with respect to the axis of the gasbag. In condition 2, the gasbag has creases extending in the meridian direction. No tensile force acts in the peripheral direction of the gasbag. In other words, a tensile force on the gasbag due to the pressure difference dP acts in the meridian direction. As the pressure difference dP increases, the gasbag flattens and changes in shape to a so-called "pumpkin shape."

When the pressure difference dP is sufficiently so high as in this embodiment, the weight and the buoyancy of the films forming the gasbag are expected to influence the shape of the gasbag little. In this case, the shape of the gasbag at large pressure difference dP changes to such a symmetrical one such as a sphere that is pressed in opposite directions. The height of the gasbag is smaller than the horizontal radius at the equator, and the gasbag is vertically symmetric. If the gasbag has a maximum volume under condition 1 and condition 2, its shape is the symmetrical shape, which is known as Euler's elastica. This symmetrical shape can be determined in the manner described below.

Figure 2:
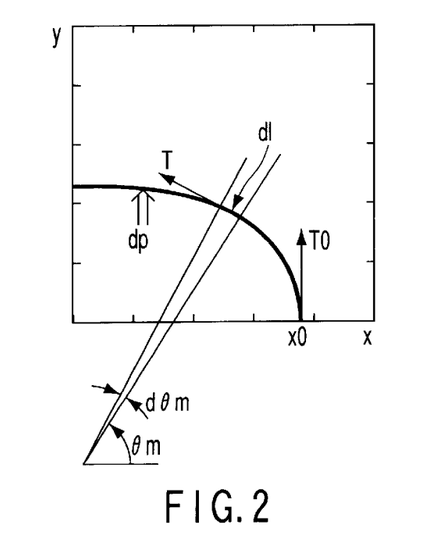
FIG. 2 is a schematic longitudinal cross-sectional view of a gasbag for determining Euler's elastica.

FIG. 2 is a schematic longitudinal cross-sectional view of a gasbag for determining the symmetrical shape. FIG. 2 shows only the upper half of the gasbag as viewed from the plane of symmetry, or equatorial plane, and in an x-y coordinate system, where $x_0$ is the radius at the equator.

Since a tensile force acts in the meridian direction only, the total sum $F_m$ of the tensile forces along the equator is the product of the sectional area S at the equator and the pressure difference dP.

$$F_m = S \cdot dP \quad (1)$$

The tensile force $T_0$ at the equator and the tensile force T at any given point (x, y) on the gasbag are respectively expressed by equations (2) and (3) below.

$$T_0 = F_m/(2\pi x_0) \quad (2)$$

$$T = F_m/(2\pi x) = x_0^2 \cdot dP/(2 \cdot x) \quad (3)$$

The radius of curvature on the gasbag is given by:

$$dL/d\theta_m = T/dP \quad (4)$$

where L is the length of the meridian, dL is the length of an infinitesimal section on the meridian and $\theta_m$ is the angle of inclination of dL.

Figure 3:
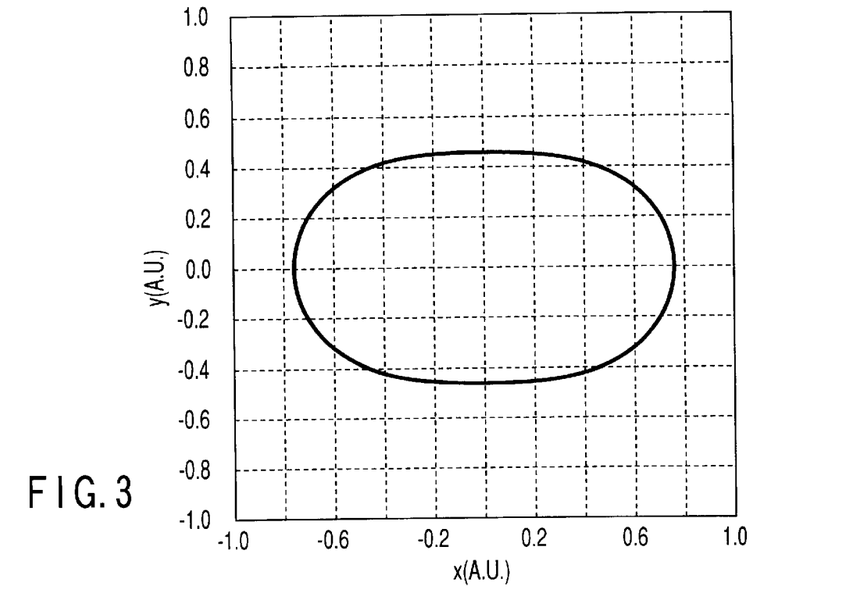
FIG. 3 is a graph of a closed curve representing a longitudinal cross-sectional view of the gasbag for determining Euler's elastica.

Differential equation (4) is solved sequentially by numerical solution to determine the shape of each dL, starting from the equator, under the initial condition that the tensile force at the equator is parallel to the y-axis and has the magnitude of $T_0$. The curve representing the longitudinal cross-sectional view of the gasbag, obtained from the numerical solution, is shown in FIG. 3. In practice, the payload is suspended from the bottom of a gasbag. The shape of the gasbag deviates a little from the one that is symmetrical with respect to the equatorial plane. The deviation is, however, practically negligible. The aforementioned pumpkin shape includes the asymmetrical shape. Additionally, the pumpkin shape is rotationally symmetric with respect to the axis of the gasbag.

The pumpkin-shaped gasbag changes to the shape discussed below when load tapes are fitted to the gasbag. Each gore of a conventional balloon has a spindle-shape obtained by dividing the rotationally symmetrical pumpkin shaped gasbag into N parts. Load tapes extend along the outer surface of the gasbag. In this embodiment each gore 2 is so shaped that it can outwardly protrude between two adjacent load tapes 3 which extend along the side edges 2a of the gore 2. The protruding gore 2 has a small radius of curvature and has a sufficiently large longitudinal dimension. As will be illustrated hereinafter, the radius of curvature of each protruding gore 2 in a direction intersecting with adjacent load tapes 3 is about ten times small as the radius of gasbag 1.

To take such a desired shape, gores 2 have a width and length greater than the gores of the conventional balloon. More specifically, the length of the meridian centerline of each protruding gore 2 which extends in the meridian direction is equal to that of the longitudinal centerline of the gore 2, not protruding yet, and the latitudinal length of each protruding gore 2 is equal to the width of the gore 2 before protruding, not protruding. Thus, each gore 2 has opposite side edges 2a whose length is longer than the length of load tapes 3. Hence, the side edges 2a are uniformly creased so that effective length of each side edge 2a coincides with the length of load tapes 3. The length of each load tape 3 is equal to that of meridian of pumpkin shaped gasbag.

Accordingly, each gore 2 outwardly protrudes, due to the internal pressure, without an elongation of the film material forming the gore 2. Satisfying such need for shape of gore 2 can reduce the meridian tensile force of each protruding gore 2 almost to zero. In other words, the tensile force on each protruding gore 2 can acts in a direction intersecting at almost right angles with its adjacent load tapes 3, that is the latitudinal direction. As such a tensile force is applied from each gore 2 to load tapes 3 adjacent to the gore 2, the load tapes 3 are pulled outwardly. Thus, the load tapes 3 receive the tensile force on the gore 2. Our experience shows that a conventional balloon that has no such protrusions has almost the same strength as a ball of the same volume. Balloons to fly in the stratosphere normally are about 30 to 50 m in radius. In this embodiment, each protruding gore 2 can have its radius of curvature reduced to about 1 m. If the radius of curvature is so reduced, the tensile force on each protruding gore 2 will decrease in accordance with the ratio of the radius of gasbag 1 to the radius of curvature of protruding gore 2. Accordingly, the pressure-resistance of the balloon will be increased accordingly. Since the radius of curvature of each protruding gore 2 is defined by the width of the film material forming the gore 2, the radius of curvature does not change significantly if the scale of the balloon is increased. In other words, the pressure-resistance of gasbag 1 does not depend on the volume of gasbag 1. The pressure-resistant balloon according to this embodiment is therefore hardly damaged under large pressure difference regardless of its scale.

Figure 4:
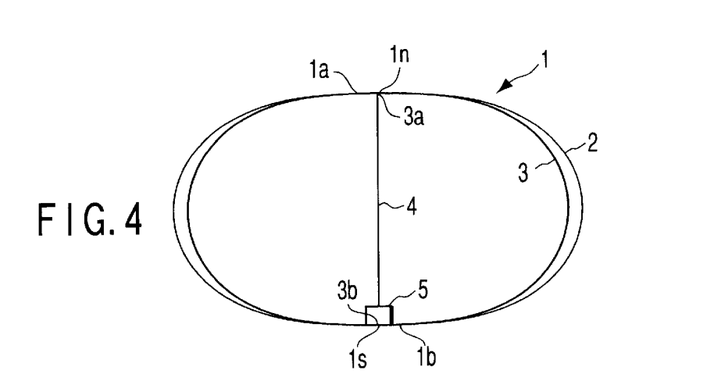
FIG. 4 is a schematic longitudinal cross-sectional view of the gasbag of the balloon according to the first embodiment.

The volume changing mechanism will be described in detail. FIG. 4 is a schematic longitudinal cross-sectional view of gasbag 1. As indicated above, gasbag 1 has the shape of a sphere pressed at north pole $1n$ side (upper side) and south pole is side (bottom side) of gasbag 1. North pole $1n$ and south pole $1s$ are in the cross section of FIG. 4. The volume changing mechanism is attached to at least one of the load tapes 3. The mechanism pulls the load tape 3 toward the inside of gasbag 1, deforming gasbag 1 that is fully inflated state. As a result, gasbag 1 changes in volume. Each of spindle-shaped gores 2 has first and second ends $2n$ and $2s$ (see FIG. 1B). Gasbag 1 includes a first section $1a$ having the first ends $2n$ of gores 2 and a second section $1b$ having the second ends $2s$ of gores 2. The set of load tapes 3 includes two pulling parts $3a$ and $3b$ which are pulled toward the inside of gasbag 1 by the volume changing mechanism. Pulling parts $3a$ and $3b$ are fitted to first and second sections $1a$ and $1b$, respectively. The volume changing mechanism pulls pulling parts $3a$ and $3b$ to change the distance between first and second sections $1a$ and $1b$.

The volume changing mechanism includes a pulling rope 4 and a rope-length regulation mechanism 5. Pulling rope 4 is attached to pulling part $3a$. Rope-length regulation mechanism 5 changes the length of pulling rope 4. Ends of load tapes 3 on the north pole $1n$ side are put together at the north pole $1n$. A ring (not shown) is arranged in gasbag 1 at north pole $1n$. The ends of load tapes 3, forming pulling part $3a$, and one end of pulling rope 4 are tied to the ring. Pulling rope 4 can pull load tapes 3 uniformly. The other end of the pulling rope 4 is attached to rope-length regulation mechanism 5, which is attached to the other ends of load tapes 3, forming pulling part $3b$. Pulling rope 4 extends between pulling part $3a$ and rope-length regulation mechanism 5. Rope-length regulation mechanism 5 changes the length of the pulling rope 4 to change the distance between pulling parts $3a$ and $3b$. The payload (not shown) is suspended on south pole $1s$ side.

Figure 5:
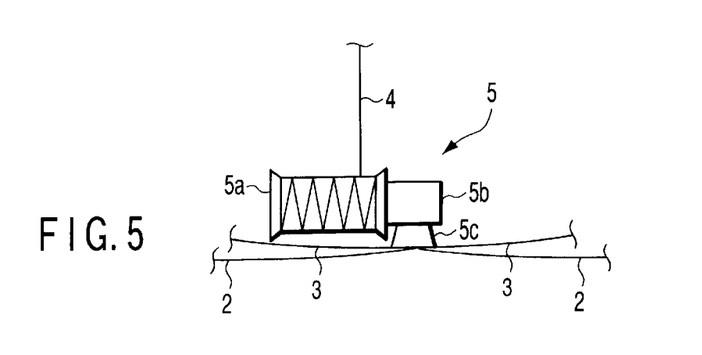
FIG. 5 is a side view of a rope-length regulation mechanism of the balloon according to the first embodiment.

As FIG. 5 depicts, rope-length regulation mechanism 5 includes a cylindrical drum $5a$ and a motor $5b$. Pulling rope 4 is wound about the drum $5a$. The motor $5b$ rotates drum $5a$. The motor $5b$ is attached to pulling part $3b$ by means of an attachment $5c$.

Rope-length regulation mechanism 5 includes a sensor which detects the length of pulling rope 4. Pulling rope 4 has a total length equal to the length that gasbag 1 has before gas is injected into gasbag 1. This length is equal to the meridian length of gasbag 1 in the fully inflated state. The distance between poles $1n$ and is decreases as gas is injected into gasbag 1 to inflate gasbag 1. At the same time, the drum $5a$ takes up the pulling rope. As the balloon rises in the air, the atmospheric pressure surrounding the balloon decreases. As a result, the volume of gasbag 1 increases, reducing the distance between poles $1n$ and $1s$. Drum 5 takes up pulling rope 4, too, as the balloon rises in the air.

When the inflating gasbag 1 becomes fully inflated, it assumes a pumpkin shape with protrusions. At this time, gasbag 1 acquires the maximum volume and hence the maximum buoyancy. As the length of pulling rope 4 extending between poles in and is decreases, gasbag 1 is deformed and poles $1n$ and $1s$ approach each other. The volume of gasbag 1 decreases, and so does the buoyancy of gasbag 1. That is, when the length of pulling rope 4 is regulated, the buoyancy and flying altitude of the balloon can be controlled.

When deformed by changing the length of the pulling rope 4, gasbag 1 can have a specific shape as will be described below. Assume that no load tapes are fitted to gasbag 1 as in the case of determining Euler's elastica. The deformed shape satisfies the above-described equation (4) below.

$$dL/d\theta_m = T'/dP \tag{4}$$

Here, the tensile force T' on gasbag 1 in equation (4) is assumed parallel to the y-axis (see FIG. 2) and smaller than the tensile force T in the case of determination of Euler's elastica.

$$T' = T + dT (dT < 0) \tag{5}$$

The deformed shape of gasbag 1 is obtained by solving equation (4), using equation (5). Solving equation (4) for different values of dT individually, shapes of gasbag 1 corresponding to respective values of dT are obtained. Meridian length L of gasbag 1 with each obtained shape depends on each value of dT. If radius $x_0$ at the equator is equal to significant value, meridian length L is constant. Finding such radius $x_0$ enables the determination of the shape and volume of gasbag 1 with the constant meridian length for each individual distance between poles $1n$ and $1s$.

Figure 6:
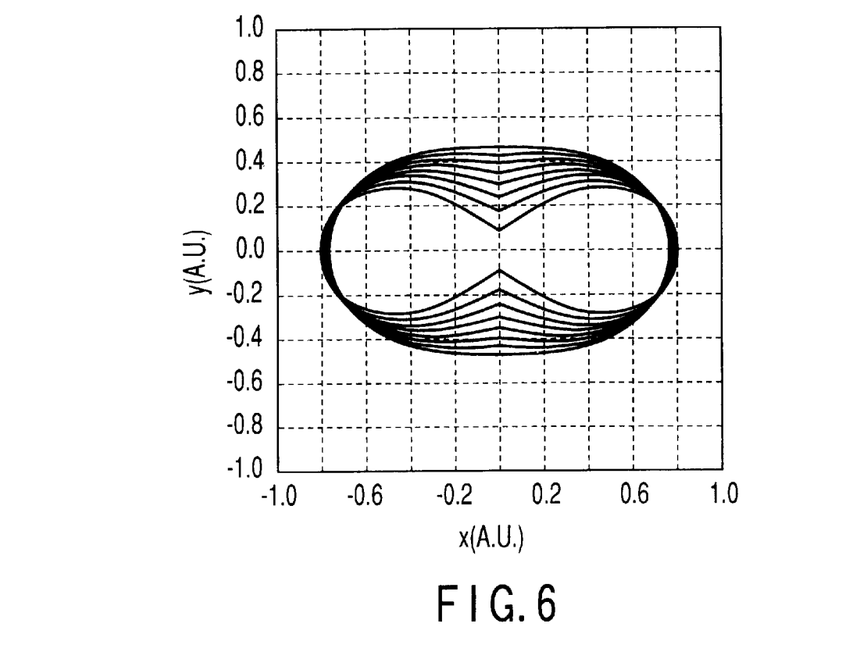
FIG. 6 is a graph of closed curves representing longitudinal cross-sectional views of a gasbag in the case where distance between poles of the gasbag changes.
Figure 7:
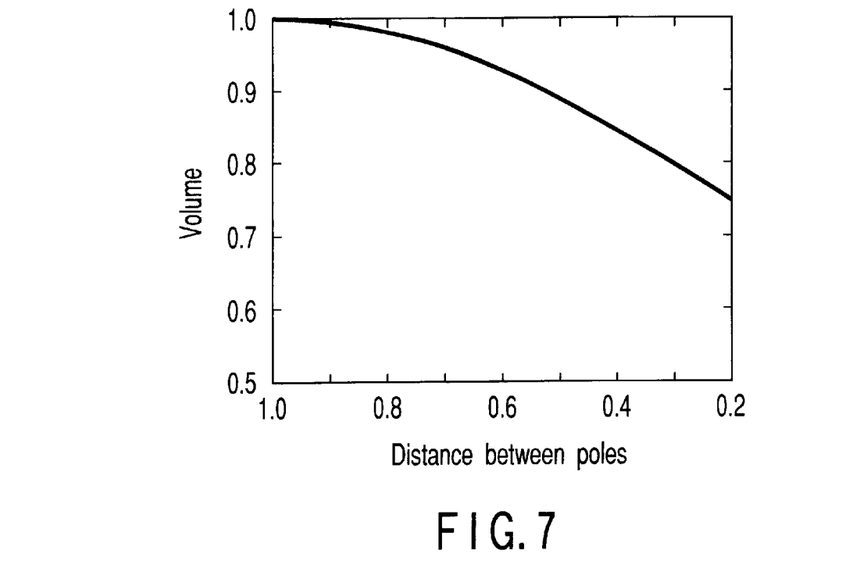
FIG. 7 is a graph showing a relationship between the distance between poles of the gasbag and the volume of the gasbag.

FIG. 6 is a graph of closed curves obtained by computation. The closed curves are on longitudinal cross section of gasbag 1 and correspond to individual distances between poles, respectively. Gasbag 1 can take a three-dimensional shape that is obtained by rotating any of the curves in FIG. 6 around y-axis. Of the illustrated eight closed curves, the one having the longest distance between poles (between the two points on the curve with x=0) and enclosing the largest area corresponds to Euler's elastica. The smaller the distance between poles, the smaller the area enclosed by the curve. FIG. 7 is a graph illustrating the relationship between the distance between poles and the volume of gasbag 1. The values of the distance between poles and volume are normalized so that those in the case of Euler's elastica are equal to one. As seen from FIG. 7, the volume decreases monotonously with a decrease in the distance between poles. Therefore, the buoyancy of the balloon can be easily controlled by changing the distance between poles. When gasbag 1 has protruding gores 2, gasbag 1 has load tapes 3 extending along the shape obtained by the above computation and each gore 2 protrudes between its two adjacent load tapes 3.

A pressure-resistant balloon according to the second embodiment has a volume changing mechanism that is different from the one used in the first embodiment. At least one of load tapes includes a pulling part which is pulled toward the inside of the gasbag by the volume changing mechanism. The pulling part of the load tape is fitted to the gore adjacent to the load tape at a longitudinal middle part of the gore.

The volume changing mechanism includes at least one pulling rope and a rope-length regulation mechanism. The pulling rope is attached to at least one of the load tapes at the pulling part. The rope-length regulation mechanism is arranged in the inside of the gasbag and changes a length of the pulling rope. The pulling rope extends between the pulling part and the rope-length regulation mechanism. The rope-length regulation mechanism changes the length of the pulling rope to change a distance between the pulling part and the rope-length regulation mechanism.

Figures 8, 9:
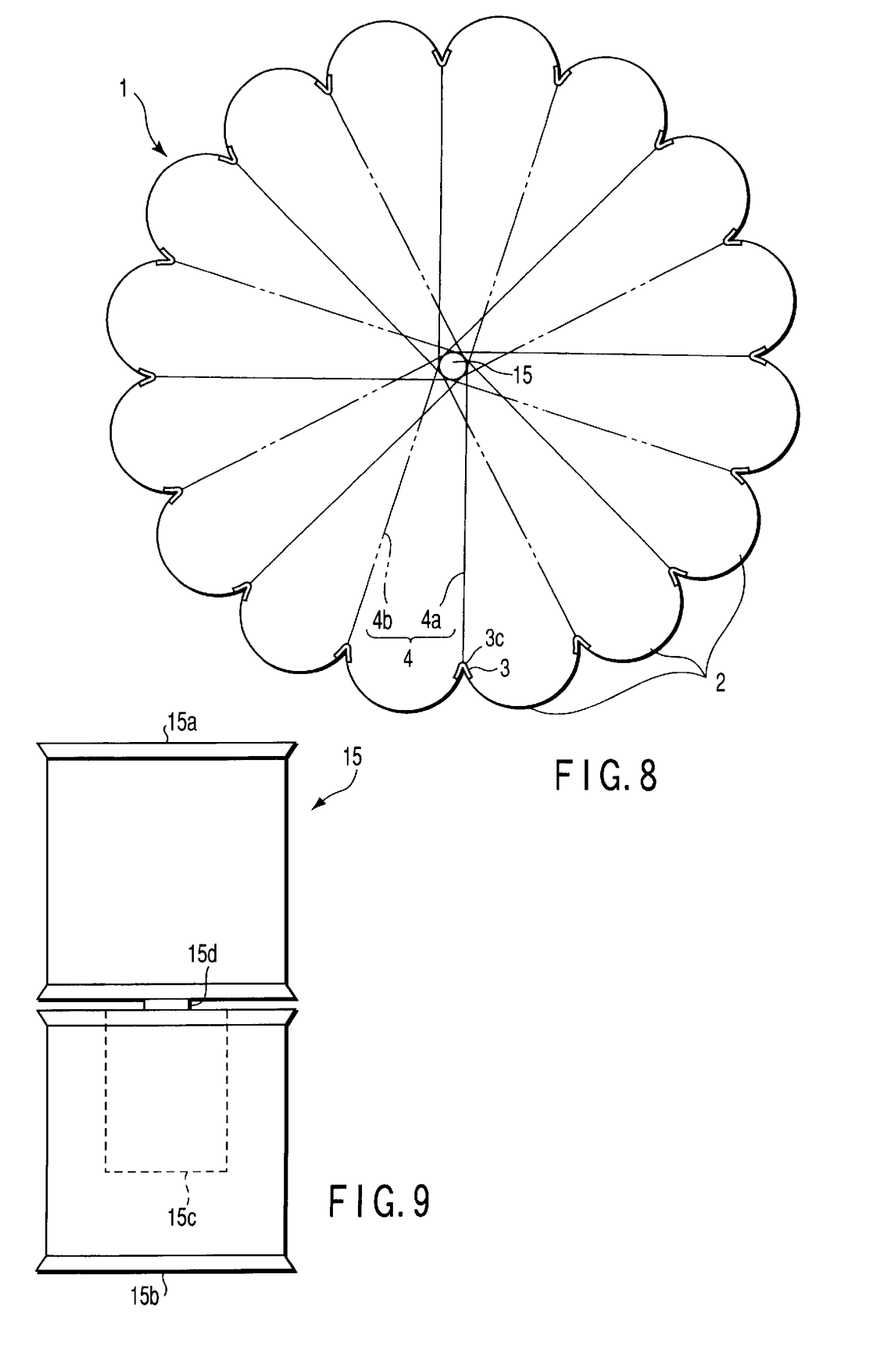
FIG. 8 is a cross-sectional view of a gasbag of a pressure-resistant balloon according to a second embodiment, taken along an equator of the gasbag.
FIG. 9 is a side view of a rope-length regulation mechanism of pressure-resistant balloon according to second or third embodiment.

FIG. 8 is a cross-sectional view of the gasbag, taken along the equator of the gasbag. A plurality of pulling ropes 4 are employed, pulling ropes 4 are attached to all load tapes 3 one by one. Each pulling rope 4 is attached to corresponding load tape 3 at the pulling part 3c of the load tape 3 fitted to the longitudinal middle part 2c (see FIG. 1B) of the gore 2. The one end of each pulling rope 4 is attached to the corresponding pulling part 3c through a ring (not shown). The one ends of pulling ropes 4a indicated by solid lines and those of pulling ropes 4b indicated by dotted broken lines are arranged by turns along the equator of gasbag 1. The other ends of pulling ropes 4a and 4b are attached to rope-length regulation mechanism 15.

As shown in FIG. 9, rope-length regulation mechanism 15 includes cylindrical drum 15a around which pulling ropes 4a are wound, cylindrical drum 15b around which pulling ropes 4b are wound and motor 15c which rotates drums 15a and 15b. Drums 15a and 15b are arranged vertically. Motor 15c is fixed to the inside of lower drum 15b. The rotational axes of drums 15a and 15b and rotating shaft 15d of motor 15c are arranged on the same vertical line. Drums 15a and 15b are connected to each other via rotating shaft 15d.

As the motor 15c is driven, drums 15a and 15b rotate in opposite directions. As a result, pulling ropes 4a and 4b are released or taken up. As rope-length regulation mechanism 15 releases or takes up each pulling rope 4 to change length of the pulling rope 4, the distance between each of the longitudinal middle parts of gores 2 and regulation mechanism 15 changes. When gasbag 1 is in the fully inflated state, poles of gasbag 1 are arranged vertically and regulation mechanism 15 is suspended by the pulling ropes 4a and 4b. The lower drum 15b including motor 15c is pulled downward due to weight of motor 15c to stabilize the position and orientation of the suspended regulation mechanism 15.

Each of pulling ropes 4a and 4b has a total length equal to the radius at the equator of gasbag 1 in the fully inflated state. Pulling ropes 4a and 4b remain taken up to drums 15a and 15b before gas is injected into gasbag 1. Pulling ropes 4a and 4b are fed out with an increase in the radius at the equator due to gas injection. After gasbag 1 becomes fully inflated, the buoyancy of the balloon may be controlled by regulating the length of the pulling ropes 4. The flying altitude of the balloon is thereby regulated as in the case of the first embodiment.

A shape of gasbag 1 deformed by changing the radius of the equator of gasbag 1 can be determined in the manner described below. Assume that no load tapes are fitted to gasbag 1 as in the case of determining Euler's elastica. The deformed shape satisfies the above described equations (4) and (5).

$$dL/d\theta_m = T'/dP \tag{4}$$

$$T' = T + dT (dT<0) \tag{5}$$

Figure 10:
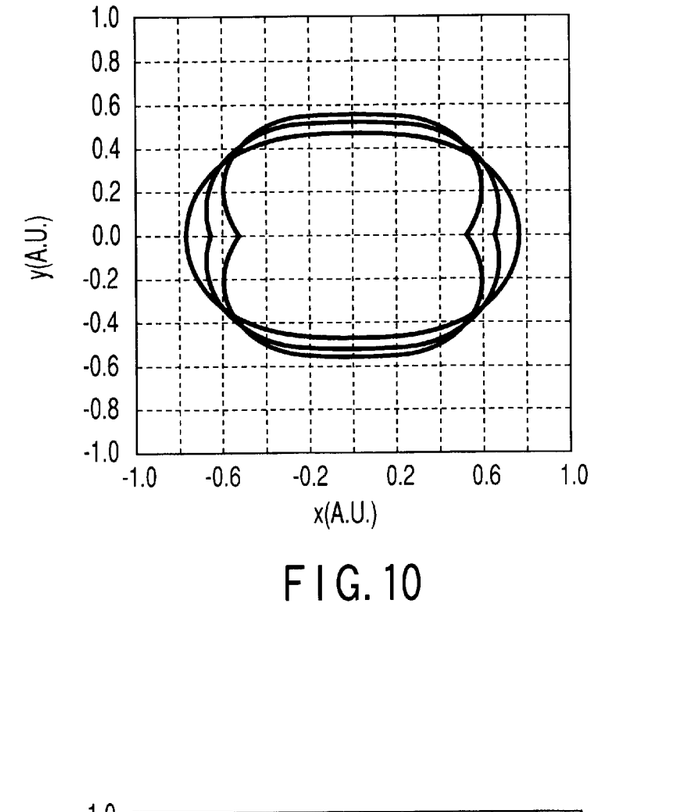
FIG. 10 is a graph of closed curves representing longitudinal cross-sectional views of a gasbag in the case where a radius at an equator of the gasbag changes.
Figure 11:
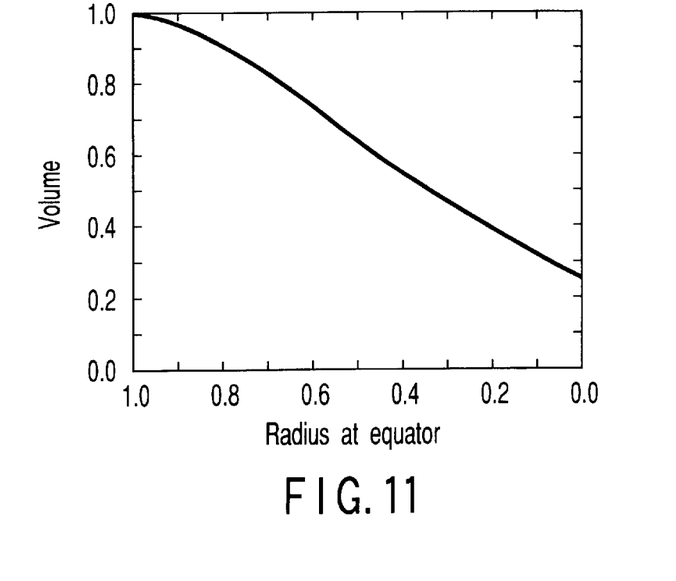
FIG. 11 is a graph showing a relationship between the radius at the equator of the gasbag and the volume of the gasbag.

FIG. 10 shows longitudinal cross sections of gasbag 1 obtained from equations (4) and (5). The radius at the equator and direction of the tensile force are set so that upper and lower parts (including north and south poles, respectively) of gasbag 1 are flat and the meridian length of the gasbag 1 is constant. Gasbag 1 can show a three-dimensional shape which is obtained by rotating any of the curves in FIG. 10 around y-axis. It will be seen that the cross section of gasbag 1 changes with changing radius at the equator. FIG. 11 is a graph representing the relationship between the radius at the equator and the volume of the gasbag 1. The values of the radius at the equator and the volume are normalized so that those in the case of Euler's elastica are equal to one. As FIG. 11 indicates, the volume of the gasbag decreases monotonously as the radius at the equator is reduced. Therefore, changing the radius at the equator easily enables the control of the buoyancy of the balloon. When gasbag 1 has protruding gores 2, gasbag 1 has load tapes 3 extending along the shape obtained by the above computation and each gore 2 protrudes between its two adjacent load tapes 3.

In the embodiment, pulling ropes 4 are attached to all load tapes 3 one by one. Alternatively, pulling ropes 4 may be attached to several load tapes 3 one by one. Ends of the pulling ropes 3 attached to the several load tapes 3 may be uniformly arranged on the equator of gasbag 1.

A pressure-resistant balloon according to a third embodiment also employs a volume changing mechanism different from that of the first embodiment. Load tapes include pulling parts 3c fitted to longitudinal middle parts 2c of gores 2 (see FIG. 1B), as in the case of the first embodiment. Each of at least two of the load tapes includes the pulling part 3c. In the third embodiment the volume changing mechanism includes a pulling rope attached to and passing through each of the pulling parts 3c, and a rope-length regulation mechanism which changes a length of the pulling rope to change a distance between adjacent pulling parts 3c.

Figure 12:
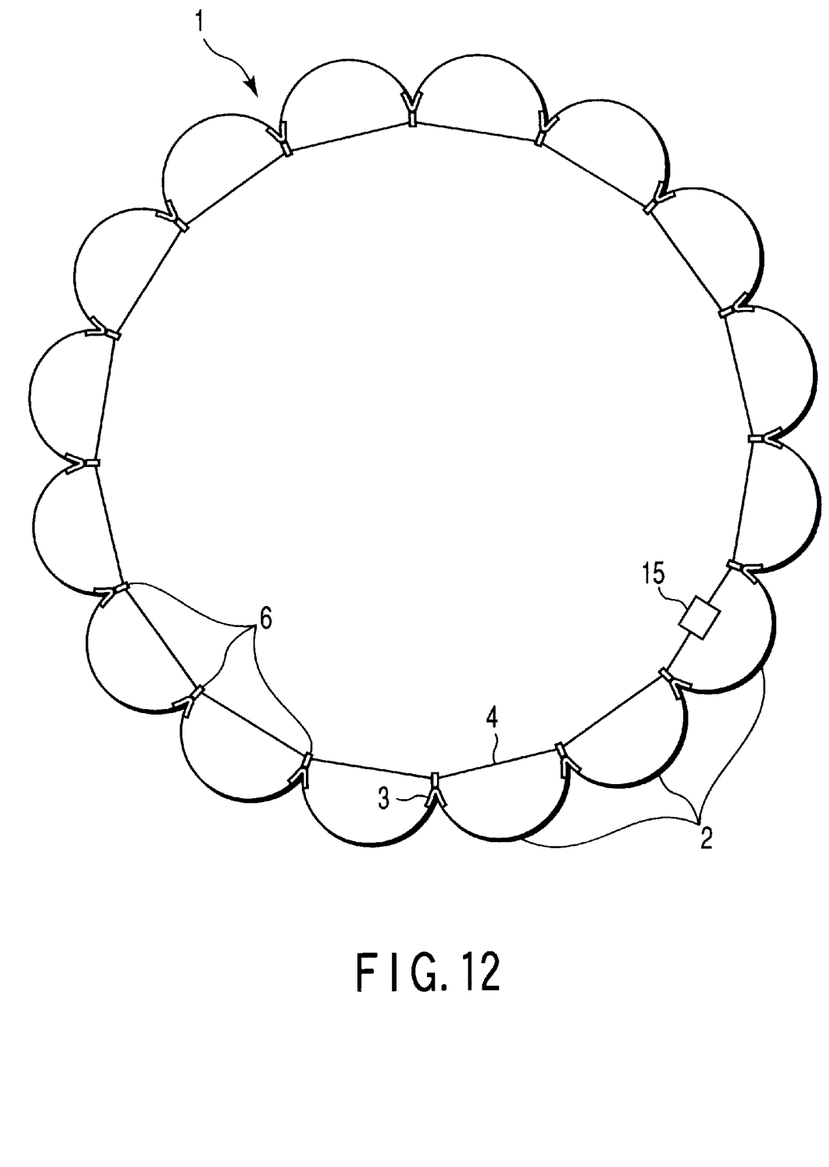
FIG. 12 is a cross-sectional view of a gasbag of the pressure-resistant balloon according to the third embodiment, taken along an equator of the gasbag.

FIG. 12 is a cross-sectional view of gasbag 1 taken along the equator. Rings 6 are fitted to pulling parts 3c, respectively. Rings 6 are arranged on the inside of gasbag 1. Single pulling rope 4 passes through all rings 6 so that pulling rope 4 extends along the equator of gasbag 1.

The same rope-length regulation mechanism 15 as one in the second embodiment is arranged between two adjacent rings 6. The opposite ends of pulling rope 4 are attached to drums 15a and 15b (see FIG. 9), respectively. As motor 15c is driven to change the length of pulling rope 4, the distance between adjacent longitudinal middle parts 2c changes. Changing the distance between adjacent parts 2c easily enables the control of the buoyancy of the balloon and the regulation of the flying altitude of the balloon as in the case of the second embodiment.

In the third embodiment, single pulling rope 4 passes through rings 6. Alternatively, a plurality of pulling ropes may pass through rings 6. For example, two pulling ropes 4 may be used in such a way that one of the pulling ropes 4 passes through some of rings 6 while the other pulling rope 4 passes through the other rings 6.

Furthermore, the volume changing mechanism in the first embodiment which changes the distance between poles and the volume changing mechanism in the second or third embodiment which changes the radius at the equator may be used in combination.

Additional advantages and modifications will readily occur to those skilled in the art. Therefore, the invention in its broader aspects is not limited to the specific details and representative embodiments shown and described herein. Accordingly, various modifications may be made without departing from the spirit of scope of the general inventive concept as defined by the appended claims and their equivalents.

What is claimed is:

1. A pressure-resistant balloon comprising:

an airtight pressure-resistant gasbag including a plurality of spindle-shaped gores of an airtight film material, adjacent gores joined together at side edges, and a set of load tapes fitted to joined sections of the side edges, the load tapes extending along the side edges, respectively; and a volume changing mechanism which deforms the gasbag in a fully inflated state to change a volume of the gasbag;

the gasbag, after inflated, allowing no gas to be discharged so as to maintain an internal gas pressure;

each of the gores outwardly protruding between two adjacent load tapes extending along the side edges of the gore, respectively, without an elongation of the airtight film material of the gore, when the gasbag is in the fully inflated state;

the protruding gores having a radius of curvature in a plane intersecting with the two adjacent load tapes, the radius of curvature being smaller than a radius of the gasbag;

the protruding gores being subject to a tensile force which is directed in the direction intersecting with the two adjacent load tapes.

2. A balloon according to claim 1, wherein the volume changing mechanism is attached to at least one of the load tapes, and pulls the load tape toward an inside of the gasbag to deform the gasbag when the gasbag is in the fully inflated state, so that the volume of the gasbag changes.

3. A balloon according to claim 2, wherein each of the spindle-shaped gores has opposite first and second ends, and the gasbag includes a first section having the first ends of the gores and a second section having the second ends of the gores, and the set of the load tapes includes two pulling parts which are pulled toward the inside of the gasbag by the volume changing mechanism, and the two pulling parts are fitted to the first and second sections, respectively, and the volume changing mechanism pulls the pulling parts to change a distance between the first and second sections.

4. A balloon according to claim 3, wherein the volume changing mechanism includes:

a pulling rope attached to one of the two pulling parts, and a rope-length regulation mechanism which is attached to the other pulling part and changes a length of the pulling rope, and the pulling rope extends between the one pulling part and the rope-length regulation mechanism, and the rope-length regulation mechanism changes the length of the pulling rope to change a distance between the two pulling parts.

5. A balloon according to claim 2, wherein at least one of the load tapes includes a pulling part which is pulled toward the inside of the gasbag by the volume changing mechanism, and the pulling part of the load tape is fitted to the gore adjacent to the load tape at a longitudinal middle part of the gore.

6. A balloon according to claim 5, wherein the volume changing mechanism includes:

at least one pulling rope attached to at least one of the load tapes at the pulling part, respectively, and a rope-length regulation mechanism which is arranged in the inside of the gasbag and changes a length of the pulling rope, and the pulling rope extends between the pulling part and the rope-length regulation mechanism, and the rope-length regulation mechanism changes the length of the pulling rope to change a distance between the pulling part and the rope-length regulation mechanism.

7. A balloon according to claim 5, wherein each of at least two of the load tapes includes the pulling part, and the volume changing mechanism includes:

a pulling rope attached to and passing through each of the pulling parts, and a rope-length regulation mechanism which changes a length of the pulling rope to change a distance between adjacent pulling parts.

* * * * *